United States Patent
Kumar et al.

(10) Patent No.: US 9,948,611 B2
(45) Date of Patent: Apr. 17, 2018

(54) PACKET TAGGING FOR IMPROVED GUEST SYSTEM SECURITY

(71) Applicant: Nicira, Inc., Palo Alto, CA (US)

(72) Inventors: Vasantha Kumar, Tamil Nadu (IN); Amit Vasant Patil, Pune (IN)

(73) Assignee: NICIRA, INC., Palo Alto, CA (US)

( * ) Notice: Subject to any disclaimer, the term of this patent is extended or adjusted under 35 U.S.C. 154(b) by 85 days.

(21) Appl. No.: 15/017,369

(22) Filed: Feb. 5, 2016

(65) Prior Publication Data

US 2017/0171159 A1    Jun. 15, 2017

(30) Foreign Application Priority Data

Dec. 14, 2015    (IN) .......................... 6692/CHE/2015

(51) Int. Cl.
*H04L 29/00* (2006.01)
*H04L 29/06* (2006.01)
*G06F 9/455* (2018.01)

(52) U.S. Cl.
CPC ...... *H04L 63/0281* (2013.01); *G06F 9/45545* (2013.01); *H04L 63/0236* (2013.01); *H04L 63/1425* (2013.01); *H04L 63/20* (2013.01)

(58) Field of Classification Search
CPC ............. H04L 63/0281; H04L 63/0236; G06F 9/45545
USPC ............................................................ 726/1
See application file for complete search history.

(56) References Cited

U.S. PATENT DOCUMENTS 6,781,990 B1 * 8/2004 Puri ........................ H04L 45/00
                                                                    370/392
7,543,054 B1 * 6/2009 Bansod ................... H04L 43/18
                                                                    370/469

* cited by examiner

*Primary Examiner* — Brandon Hoffman
*Assistant Examiner* — Michael D Anderson
(74) *Attorney, Agent, or Firm* — Adeli LLP

(57) ABSTRACT

Some embodiments provide a novel method for monitoring network requests from a machine. The method captures the network request at various layers of a protocol stack. At a first layer of a protocol stack, the method tags a packet related to the network request with a tag value, maps the tag value to a set of tuples associated with the packet, and sends a first set of data related to the packet to a security engine. At a second layer of the protocol stack, the method determines whether the packet has been modified through the protocol stack, and sends an updated second set of data to the security engine when the packet has been modified.

24 Claims, 12 Drawing Sheets

PACKET TAGGING FOR IMPROVED GUEST SYSTEM SECURITY

BACKGROUND

As networks expand, it becomes increasingly difficult to manage and maintain network policies for the different machines of the network. Various security applications are used to provide security for a network, including firewalls, antivirus and malware detection, etc.

In virtualized networks in particular, security and authorization for network requests to and from the guest machines becomes increasingly complex and difficult. Virtual hosting networks often have multiple entry points to the network, increasing the need for security and authorization at each of the end machines. In addition, security policies have become increasingly complex, allowing an administrator to make security policy decisions based on context information (e.g., application and/or user information, etc.) and connection information (e.g., source/destination addresses, etc.)

One of the challenges in today's hosting system networks is providing efficient and secure context-based authorization for network requests of virtual machines operating on host machines in a network. In some cases, the end machines may become compromised and cannot be fully trusted to maintain the security of the network. In other cases, network request packets may be modified as they are processed through the end machines, and attempts to apply security policies to the network request packets may fail when the packets change before or after the security decision is attempted.

BRIEF SUMMARY

Some embodiments provide a novel method for monitoring network requests from a machine. The method captures the network request at various layers of a protocol stack. At a first layer of a protocol stack, the method tags a packet related to the network request with a tag value, maps the tag value to a set of tuples associated with the packet, and sends a first set of data related to the packet to a security engine. At a second layer of the network stack, the method determines whether the packet has been modified through the network stack, and sends an updated second set of data to the security engine when the packet has been modified. In some embodiments, first and second sets of data also include user data for a user and/or application that initiates the network request.

In some embodiments, the method determines whether the packet has been modified by identifying the tag value for a packet, identifying a set of tuples mapped to the tag value, and comparing the set of tuples mapped to the tag value to the set of tuples identified for the packet.

Some embodiments provide a security agent that operates on several virtual machines (VMs) on a host machine, as well as a security engine that operates on a secure VM on the same host machine. The security agents send network request information to the security engine to provide context for the various network requests. The security agents of some embodiments send the request packets to the security engine to enforce the security policies, while in other embodiments, the security agents receive security decision responses from the security engine and enforce the security decision responses directly.

In some embodiments, the security engine is one of many security virtual machines that operate on the host machine. Security virtual machines in some embodiments provide third-party security services (e.g., authorization, encryption, malware detection, antivirus, etc.) through secured virtual machines that operate on the host machine. In some embodiments, the security virtual machines communicate with the security agents through a standardized protocol.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION OF THE INVENTION

Figure 1:
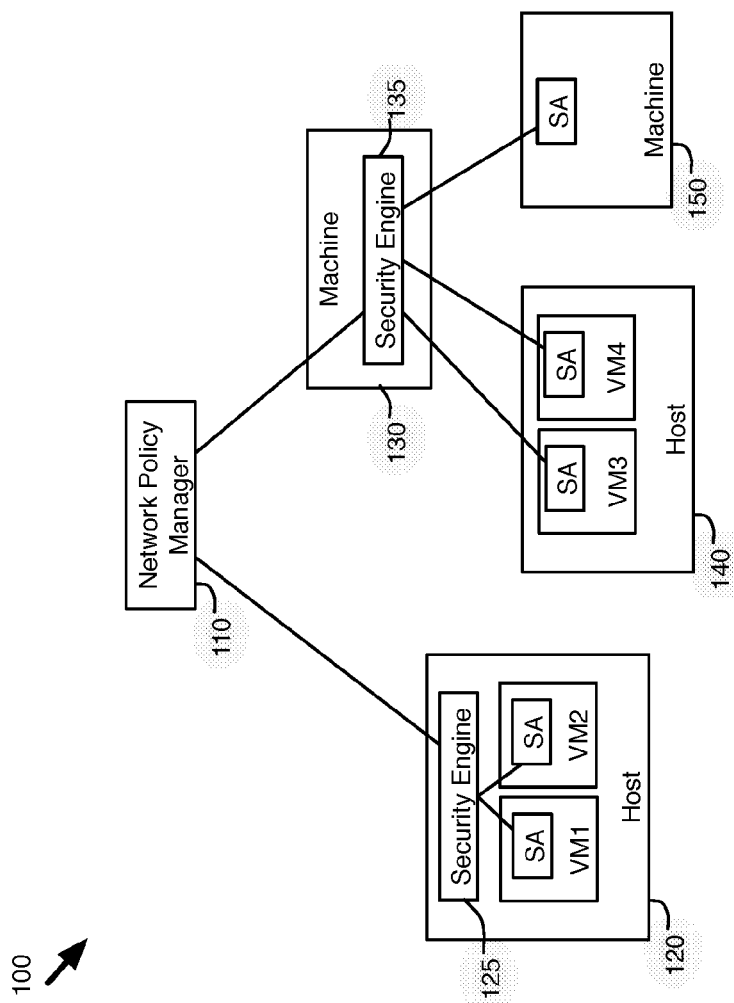
FIG. 1 illustrates an example of a security system that uses external secured security engines to enforce security policies for various machines in a network.

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments provide a novel method for monitoring network requests from a machine. The method captures the network request at various layers of a protocol stack. At a first layer of a protocol stack, the method tags a packet related to the network request with a tag value, maps the tag value to a set of tuples associated with the packet, and sends a first set of data related to the packet to a security engine. At a second layer of the protocol stack, the method determines whether the packet has been modified through the protocol stack, and sends an updated second set of data to the security engine when the packet has been modified. In some embodiments, first and second sets of data also include user data for a user and/or application that initiates the network request.

In some embodiments, the method determines whether the packet has been modified by identifying the tag value for a packet, identifying a set of tuples mapped to the tag value, and comparing the set of tuples mapped to the tag value to the set of tuples identified for the packet.

Some embodiments provide a security agent that operates on several virtual machines (VMs) on a host machine, as well as a security engine that operates on a secure VM on the same host machine. The security agents send network request information to the security engine to provide context for the various network requests. The security agents of some embodiments send the request packets to the security engine to enforce the security policies, while in other embodiments, the security agents receive security decision responses from the security engine and enforce the security decision responses directly.

In some embodiments, the security engine is one of many security virtual machines that operate on the host machine. Security virtual machines in some embodiments provide third-party security services (e.g., authorization, encryption, malware detection, antivirus, etc.) through secured virtual machines that operate on the host machine. In some embodiments, the security virtual machines communicate with the security agents through a standardized protocol.

An overview of the process for authorizing network requests by tagging and capturing information at guest VMs for the network requests has been described above. Further details and examples of the tagging and authorization system are described below. Specifically, Section I describes a packet tagging system for tagging network requests using a security engine and a group of security agents that operate on machines in the network. Section II describes the process and different examples of tagging outbound network requests through the packet tagging system. Section III then describes the process and different examples of tagging inbound network requests through the packet tagging system. Section IV then describes an electronic system with which some embodiments of the invention are implemented.

I. Packet Tagging System

Some embodiments of the invention are implemented in a distributed security system for machines in a network. FIG. 1 illustrates an example of a security system that uses external secured security engines to enforce security policies for various machines in a network. In some cases, the secured security engines operate on separate machines from the machines that they manage, while in other cases, the security engines operate on the same machine, but in a separate space (e.g., a VM, container, hypervisor module, etc.) from the guest machines.

The security system 100 includes a network policy manager 110, hosts 120 and 140, and server machines 130 and 150. The network policy manager 110 communicates with various distributed security engines 125 and 135 to enforce network policies, such as identity firewall rules, for the various end machines (i.e., virtual machines VM1-VM4, machine 150), which each executes a security agent (SA). The security agents use the security engines 125 and 135 to authorize network requests of the end machines in the security system 100.

The network policy manager 110 is for managing network policies for communications between end machines in a network. In some embodiments, a network administrator uses the network policy manager 110 to define a network policy that determines firewall rules and other security settings that can be pushed to the security engines 125 and 135 in the network. The centralized network policy manager 110 of some embodiments operates on a separate centralized network policy management server, while in other embodiments, the centralized network policy manager 110 shares a physical server with guest virtual machines of the network.

The network policy manager 110 of some embodiments communicates with security engines 125 and 135 in the security system 100 to distribute and enforce the network policy. The security engines of some embodiments receive firewall rules and other network security settings and use the received security information to authorize network requests made by security agents operating on the end machines. In some embodiments, the security policies are enforced by the security agents, while in other embodiments, the security engines capture the network events (e.g., network connection requests) of the end machines in order to enforce the security decisions.

In this example, security engine 125 operates on a host machine 120, along with virtual machines (VMs) VM1 and VM2. The security engine 125 is a security appliance running on a dedicated secure virtual machine (SVM) that provides protection to all virtual machines on the host machine 120. Security engine 135 operates on another machine 130, and unlike security engine 125, operates on a separate machine from the security agents for VM3, VM4, and machine 150, for which it provides security services. In this example, security engine 135 is a dedicated security appliance (e.g., a server or other hardware device), which receives network security requests from security agents operating on both virtual machines VM3 and VM4, as well as a bare-metal machine 150.

The security engines 125 and 135 of some embodiments are third party applications or appliances that communicate with the security agents through a standardized application programming interface (API) (e.g., End Point Security (EPSec)). The communication protocol allows the security agents to monitor file and network activity on the guest machines and to communicate the information to the third party security engines. In some embodiments, packets (e.g., all packets, network connection request packets, etc.) are sent to the security engines to be processed.

Each end machine executes a security agent (SA) that communicates with a corresponding security engine to authorize various network requests of the virtual machines. The end machines include virtual machines VM1 and VM2. A virtual machine is managed by virtualization software executing on a physical host machine. Virtualization software can also manage additional virtual machines. Virtualization software can be native or hosted, and manages one or more virtual machines, permitting multiple concurrent instances of operating systems on the same computer hardware resources.

Each of the end machines also executes various applications for an end user of the guest machine. In some embodiments, applications operating on the end machines send network socket event requests. A network socket is an endpoint with a local address and local port. A resulting network connection includes a source Internet Protocol (IP) address, source port, protocol, destination IP address, and destination port. Connection-oriented sockets such as Transmission Control Protocol (TCP) sockets may have a connection state, while connectionless sockets, such as User Datagram Protocol (UDP) sockets, do not. A network socket event request may be a status change in a network socket (e.g., UDP or TCP events such as network open, network close, listen, etc.).

When the applications (or the system) of the end machines make network requests, the security agents operating on the various end machines VM1-VM4 and machine 150 capture the network requests and send context information and connection information to the security engines 125 and 135. In some embodiments, the security agent is a thin agent (e.g., Transport Driver Interface (TDI), Windows Filtering Platform (WFP), Netfilter, Winsock, etc.) that operates between layers of the network protocol stack on the end machines. In some embodiments, the security agent operates in a secured memory of the various end machines VM1-VM4 that cannot be readily modified by processes operating in the end machines. The secured memory of some embodiments is monitored against tampering by other processes operating in the end machines.

The security engines 125 and 135 of some embodiments then (1) identify corresponding security rules for the context and connection information, (2) capture network packets matching the context and connection information, and (3) process (allow, drop, modify, etc.) the network packets according to the security rules. In some embodiments, the security engine makes a decision on the calls and provide the decision back to the security agents, which then take action on the network requests based on the received decision.

Figure 2:
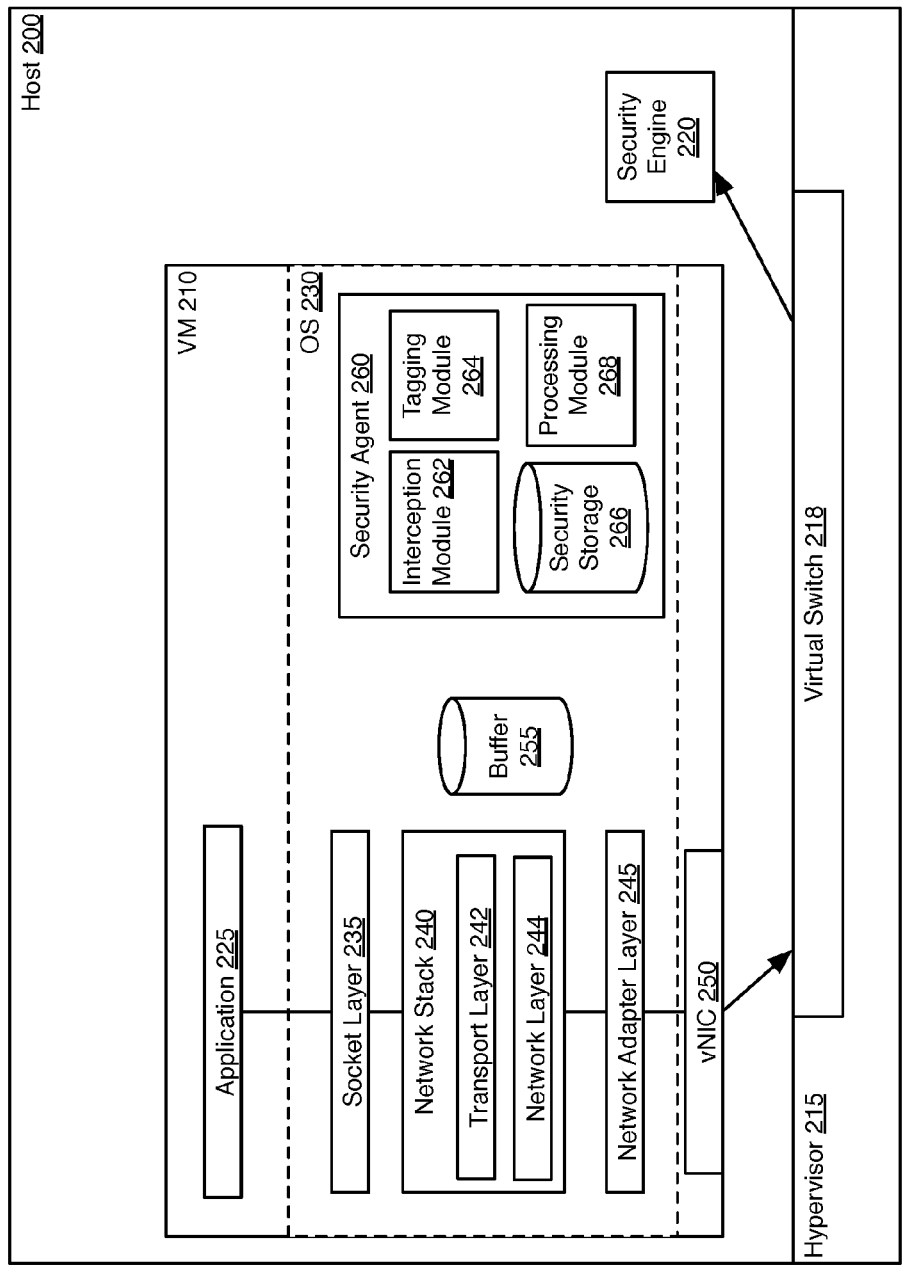
FIG. 2 illustrates an example architecture of a host machine in a network.

FIG. 2 illustrates an example architecture of a host machine (like host 120 described above in reference to FIG. 1) in a network. The host machine 200 includes a virtual machine (VM) 210 and a security engine 220 that both operate on a hypervisor 215 of the host machine 200. The hypervisor 215 is a virtualization software layer that executes on the host machine. The hypervisor 215 provides virtualized access to hardware of the host machine 200 (e.g., a virtual storage device, a virtual network interface card (vNIC), virtual memory, a virtual processor, etc.) for a set of VMs 210 that may operate on the hypervisor 215. Although shown with a single VM and a single security engine, one skilled in the art will recognize that a host machine may host several VMs and security engines.

In some embodiments, the hypervisor 215 includes a virtual switch 218 for transmitting network traffic of the various VMs operating on the host machine 200. The virtual switch 218 of some embodiments is an emulated hardware switch that executes in the hypervisor 215 and routes network communications between VMs executing on the host machine 200 or to other end machines in the network. In some embodiments, the virtual switch 218 is configured to send all network traffic for the guest VMs to a security engine (e.g., a security VM) coupled to the virtual switch.

The VM 210 shows an application 225 that operates on a guest operating system (OS) 230 of the virtual machine. The application 225 can be any user application that makes network connection requests that are handled by the operating system to create connections for communicating with other machines in the network. For example, an application, such as a web browser, may make a network connection request to a server (e.g., at website.com). The OS 230 handles the network requests to make the connections.

Operating systems use various interfaces and protocols to handle the network requests of applications. These various interfaces and protocols can be described as a set of layers, with each layer receiving certain inputs, performing particular functions, and generating particular outputs to communicate with the surrounding layers. The Open Systems Interconnection (OSI) network model describes various different layers for network communications.

The particular combination of protocols and/or interfaces that are used for a particular operation is referred to as a protocol stack. Different implementations may combine or separate the functionalities of the different layers of the OSI network model. For example, Transmission Control Protocol/Internet Protocol (TCP/IP) is a commonly used protocol stack that combines the functionalities of some of the layers of the OSI network model. Although examples in this application are described with reference to the TCP/IP stack, it is not intended to limit the invention to any particular set of protocols.

In this example, the guest OS 230 includes a socket layer 235, a network stack 240 (with transport layer 242 and network layer 244), network adapter layer 245, virtual network interface card (vNIC) 250, buffer 255, and security agent 260. The socket layer 235 of some embodiments provides socket APIs to allow application 225 to create network connections. The socket layer 235 processes the network request and passes it to the network stack (e.g., TCP/IP stack), which is depicted with a transport layer 242 and network layer 244. In the case of an outgoing network connection request, the network stack 240 of some embodiments processes the network request to create a set of packets that are sent to the destination machine. The network stack 240 uses the packets to initiate the connection through a multi-step handshake with the server to establish the connection.

For example, in a TCP/IP implementation, the transport layer 242 establishes the connection and maintains the state (for TCP connections) for the connection. The transport layer 242 creates a synchronization (SYN) packet with a 5-tuple (i.e., source IP address, source port, destination IP address, destination port, protocol) to be sent to the destination server. The server responds with a SYN-ACK packet, and the VM 210 completes the handshake with an ACK packet. The handshake allows the VM 210 to establish the parameters for the network connection with the server computer. The SYN packet is then sent to the network layer 244, which performs IP addressing operations to forward the packet through the network.

The network adapter layer 245 is the last layer where an outgoing packet can be captured and modified prior to being laid on the wire and sent through the vNIC 250. In some embodiments, the network adapter layer 245 is an interface layer between the network stack and a network adapter (e.g., a vNIC, or physical network interface card (NIC)). For example, Windows provides a Network Driver Interface Specification (NDIS) to interface with the network adapter or vNIC 250. NDIS provides access to a packet immediately before being sent out on the vNIC or immediately after being received through the vNIC. From the vNIC 250, the network request packets are then sent through the virtual switch 218 of the hypervisor 215 toward the destination machine.

In order to enforce security policies on the connection requests sent by the application 225, some embodiments of the invention provide a security agent 260 for monitoring network connection requests of the application. In some embodiments, the security agent 260 intercepts network requests made by the application 225 and captures various information (e.g., context information, connection information, etc.) about the network request. The security agent 260 also tags and verifies the network requests to detect any changes in the network request as it traverses the layers of the OS 230. The security agent 260 provides the captured context information and updated connection information to an external security engine 220 that enforces security policies for the host machine 200. In some embodiments, the security engine 220 enforces the network security policies on the network connection requests by capturing the packets after they have left the VM. Alternatively, or conjunctively, the security engine 220 provides a security decision, but the security agent 260 enforces the policies at the guest VM 210 directly.

The security engine 260 includes an interception module 262, a tagging module 264, a security storage 266, and a processing module 268. In this example, the security agent 260 is shown as a part of the guest OS 230, but in some embodiments, the security agent 260 and security storage 265 operate separate from the guest OS 230.

The interception module 262 of some embodiments intercepts network requests at various layers of the OS 230. In some embodiments, the security agent 260 is implemented as a thin filter agent that wraps the different processing layers with callback functions to capture the inputs and/or outputs of the various layers. For example, in some embodiments, the security agent 260 is implemented using Microsoft's Windows Filtering Platform (WFP), through network hooks and callbacks that capture and operate on the network requests. WFP filters at multiple layers as the connection traverses the TCP/IP stack to the network driver. WFP includes an application layer enforcement (ALE) layer that operates to capture network requests before being processed by the network stack. All TCP segments associated with a connection identified in the ALE are available at the transport layer.

The different layers of the operating system may provide different levels of access to information for the network request. For example, a higher layer (e.g., the socket layer 235) may provide a high level view of the network request, with access to the requesting application and/or user identifications, while lower layers may only have access to information about the state of the connection or about individual frames. Therefore, the interception module 262 of some embodiments captures the network requests at different layers of the OS 230 in order to capture different types of information.

For example, the interception module 262 of some embodiments intercepts the network request at the socket layer 235 in order to capture context information (e.g., application and/or user information for the user or application that initiated the network request) and intercepts the network request again at the transport layer 242 in order to capture connection information (e.g., source/destination addresses, ports, protocol, etc.). The interception module 262 of some embodiments captures and holds the network request until the captured context information is sent to (and, in some embodiments, verified by) the security engine 220. By capturing and holding the network requests, the security agent 260 prevents other packets from attempting to use the connection.

The security agent 260 sends the information regarding the network connection request (e.g., context, source/destination addresses, ports, protocols, etc.) as a network event to the security engine 220. Network events are used for identity firewall and other firewall pieces to make decisions (e.g., whether to allow a particular user to make a connection to a particular IP from a particular application). The policies will be filtered on the security engine 220. The security engine 220 will be described in further detail below.

In addition to capturing different types of information at the different layers, the interception module 262 intercepts the network requests at different layers of the OS 230 in order to tag and verify the network request packets. Tagging the network request packets allows the security agent 260 to verify a particular network request, even when certain parameters (i.e., 5-tuples) of the network request are modified, to ensure that the security policies account for the modified network request. If a packet is modified after the packet information is sent to the security engine 220, a policy breach can occur because the security engine 220 attempts to make a policy decision based on incorrect information.

For example, some network configurations use a proxy filter that diverts network requests for a first address (e.g., website.com) to a proxy server. In such a case, the security agent 260 may send information about the first address (website.com) to the security engine 220 for enforcement, but the security engine 220 may never see the network request because it was diverted to the proxy server prior to reaching the vNIC. The modified network request references the proxy server and no longer matches the context information received from the security agent 260 (i.e., website.com) so the security engine 220 is unable to identify security policies for the network request based on the context information.

In order to provide accurate information about the connection request to the security engine 220, the security agent 260 of some embodiments intercepts the network connection requests at multiple layers of the OS 230 to tag and verify the connection request. In some embodiments, the security engine 260 captures the network request at a nearest layer to the origin of the packet (e.g., the transport layer for an outgoing network request and the network adapter layer for an incoming request) to tag the packet and recaptures the network request at the last layer (e.g., the network adapter layer for an outgoing network request and the transport layer for an incoming request) to verify the packet for the network request.

For example, for outgoing network requests from the application 225, transport layer 242 creates network request packets in the buffer 255. The interception module 262 captures the incoming request packets at the transport layer 242 and tagging module 264 tags the request packets in the buffer 255. Tagging module 264 also stores a mapping of the tag value to current packet information (e.g., 5-tuple) in the security storage 266. In some embodiments, the tag is a TCP endpoint handle, a 64-bit tag value for tagging packets in the buffer 255. The security storage 266 of some embodiments is a secured storage that stores mappings between the tag values and the connection information (e.g., tuple information) of the network requests.

Once the packets are processed through the various layers of the OS 230, interception module 262 recaptures the packet at the network adapter layer 245, where the processing module 268 verifies the tagged information before the packet is sent through the vNIC 250 to the virtual switch 218. In some embodiments, the processing module 268 verifies the tagged information by comparing the packet information of the packet captured at the last layer (e.g., network adapter layer 245) with the information stored in the security storage 266 at an earlier layer (e.g., transport layer 242) to determine whether the packet has been modified.

For incoming network requests (e.g., from a client to a server application 225), the interception module 262 captures the incoming request packets at the network adapter layer 245 and the tagging module 264 tags them. The interception module 262 then recaptures the incoming request packets again at the transport layer 242, where the processing module 268 verifies the values of the incoming packets before passing them to the application 225.

In some embodiments, when a packet is recaptured and determined to have been modified, the processing module 268 of the security agent 260 resends the context and connection information for the network request to the security engine 220. The security engine 220 is then able to process the network event based on the context information captured at the upper layers (i.e., nearest the application 225) along with the modified connection information of the packet at the lower layers (e.g., network adapter layer 245).

In some embodiments, in addition to capturing the packets, the processing module 268 can also allow, deny, or modify the packets based on a response received from the security engine 220. For example, in the case of incoming packets, the processing module 268 of some embodiments sends the network request information to the security engine 220, receives a response, and drops the network request packets before they can be sent to the application 225.

However, in preferred embodiments, the enforcement of security policies is performed entirely by the security engine 220, external to the VM 210. The external security engine 220 (e.g., a security VM operating on the host machine) enforces security policies from outside of the guest VMs because it is not secure to do the enforcement at the guest machines, which may become compromised.

The security agent 260 operates on the guest machine and passes the captured network event information (e.g., user, application, tuple information) to the security engine 220, but does not directly interact with the packets (other than tagging). When a packet exits the guest machines, the security engine 220 of some embodiments captures the packet and enforces the security policies (based on the updated network event information) from outside of the guest VM 210. By performing the verification (or reconciliation) of network requests at multiple layers, even if the agent is compromised at any one layer, the reconciliation at other layers will act as a check to detect when the agent is compromised.

The security engine 220 performs various security functions such as identity based firewalls, etc. The security engine 220 receives communications (e.g., packets intended for transmission to or received from other end machines in the network) and determines an action (e.g., allow, deny, redirect, etc.) to perform on the packet with respect to security policies of the network. For example, in some cases, the security engine 220 is used to authorize network connection requests of the VMs based on the identity of a user and/or application that makes the request and on other information associated with the request (e.g., source/destination addresses, ports, protocols, etc.).

In this example, security engine 220 is shown as a separate virtual machine that operates on the hypervisor 215, but in some embodiments, the security engine 220 is implemented as a security module that operates within the hypervisor 215, or at each port of the virtual switch 218. In some such embodiments, the security engine 220 is a distributed security module that captures packets from the guest VMs and performs the security functions for the guest VMs operating on each host machine. In some embodiments, each guest VM on the host machine is associated with a separate security module, which captures and filters all traffic for the host machine.

In some embodiments, the security engine 220 is one of many security virtual machines that operate on the host machine 200. Security virtual machines in some embodiments provide third-party security services (e.g., authorization, encryption, malware detection, antivirus, etc.) through secured virtual machines that operate on the host machine 200. In some embodiments, all of the various third-party security virtual machines communicate with the security agents 260 through a standardized protocol.

II. Monitoring Outbound Connections

Figure 3A:
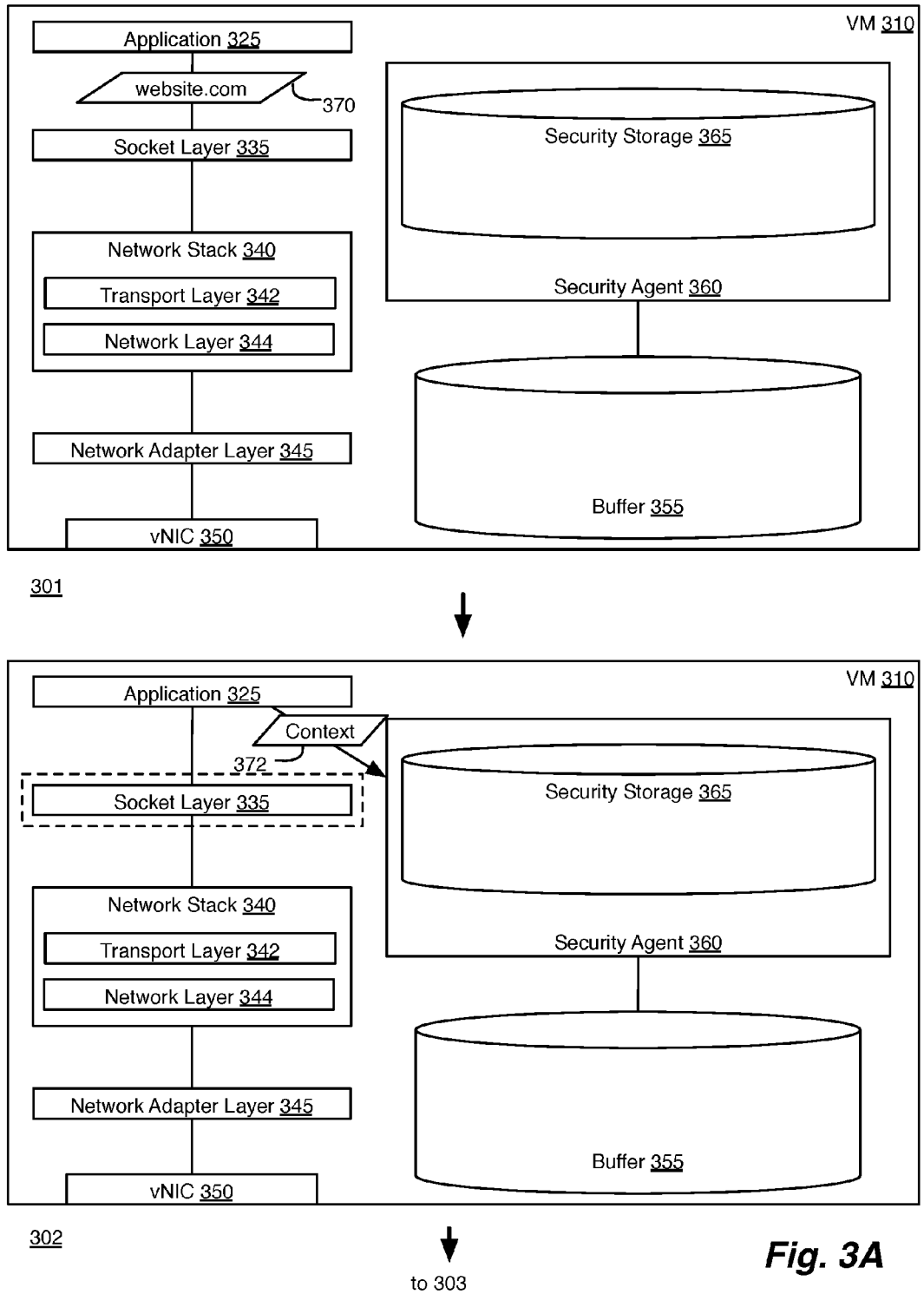
FIGS. 3A-C illustrate an example of monitoring outbound connections.
Figure 3B:
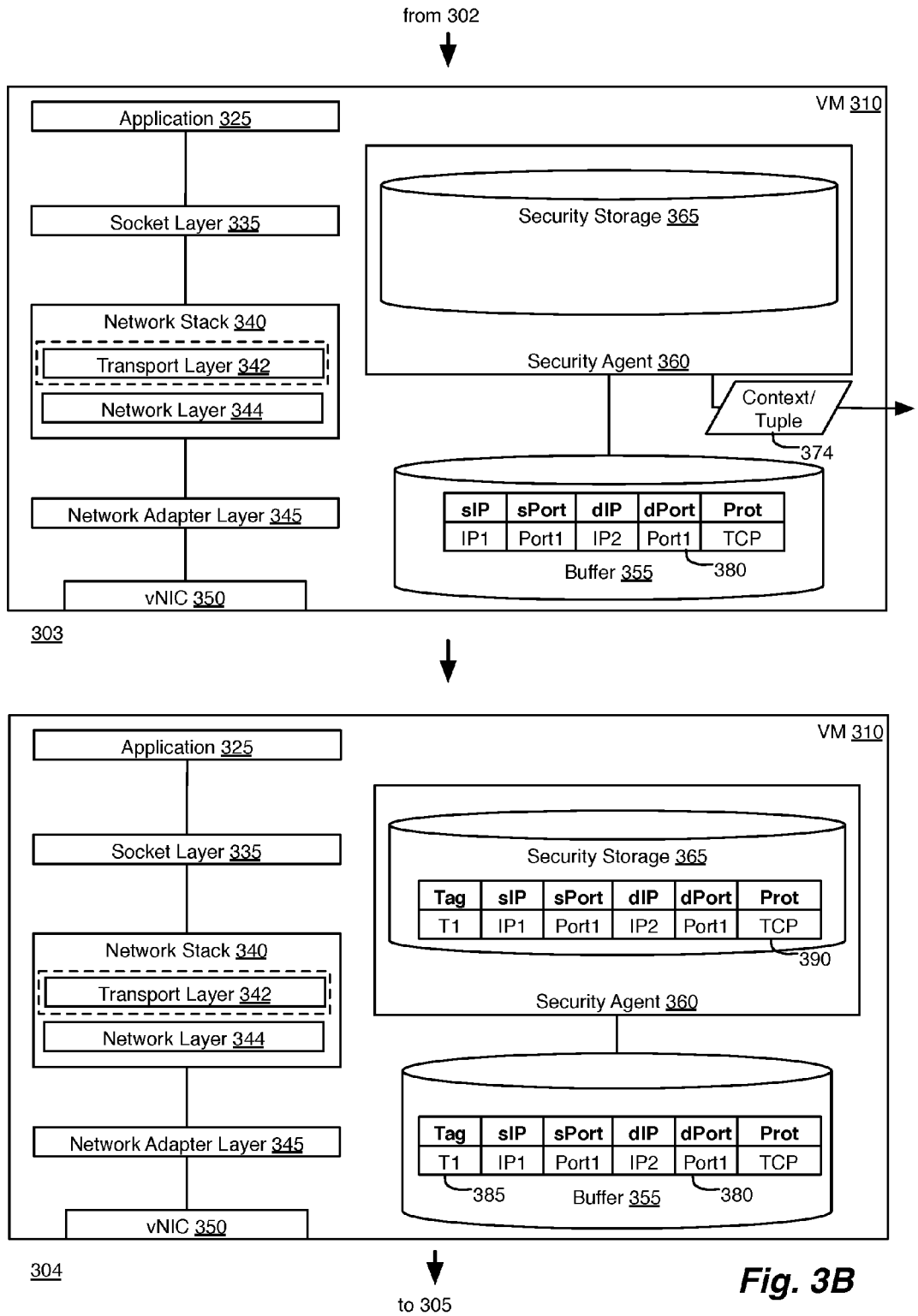
Figure 3C:
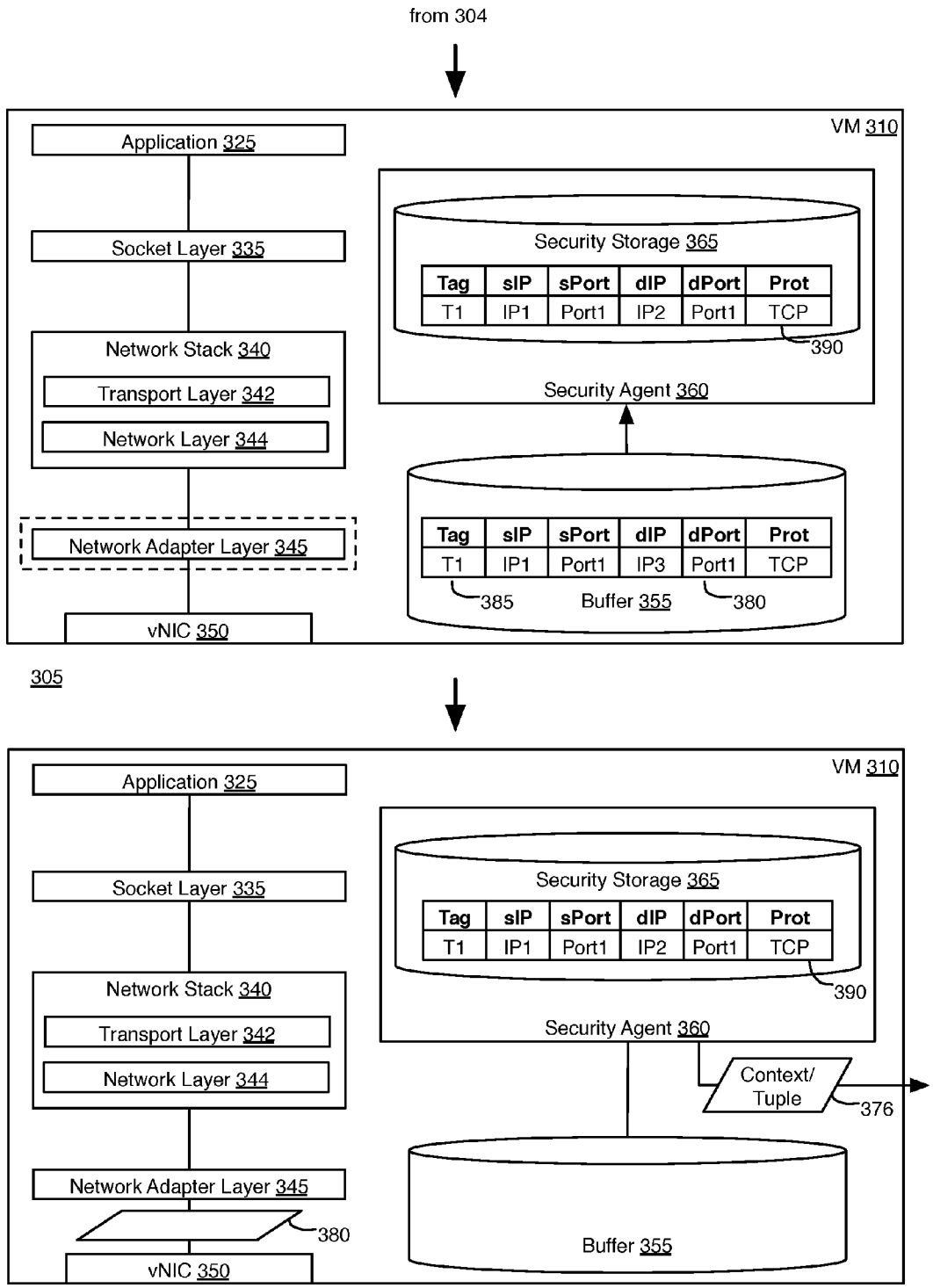

A packet tagging system, such as the one described above is used to monitor the network connection requests to and from applications. FIGS. 3A-C illustrate an example of monitoring outbound connections in six stages 301-306. Each stage of this example shows a VM 310 similar to the VM 210 and the corresponding elements shown in reference to FIG. 2. The first stage 301 illustrates that the application 325 sends a network request 370 to the socket layer 335 to establish a connection with another application operating on another machine (e.g., a server). In this example, application 325 sends a network request 370, which specifies a destination address (i.e., website.com). Such a request may be made by a browser application when a user of the application selects a link or otherwise specifies the desired address.

In the second stage 302, the request 370 from application 325 has been captured at the socket layer 335. The security agent 360 of some embodiments blocks the requested network connection at the socket layer to prevent any other packets from being transmitted using the connection. The second stage 302 also shows that the security agent 360 gathers context data 372 from the application 325. The context data 372 of some embodiments includes application and system data, such as application identification, user identifications, etc.

In some embodiments, the context data is gathered at a layer of the operating system above the network stack (e.g., socket layer 335), at which the network connection request packets have not yet been generated. In some embodiments, the security agent 360 obtains the context data 372 from the guest operating system through an API provided by the guest operating system.

The third stage 303 shows that a connection request packet 380 to initiate the network request is generated by the transport layer 342 of the network stack 340 and stored in the buffer 355. Security agent 360 collects connection information (e.g., tuple information) regarding the network connection request packet 380 and sends the connection information, along with the gathered context information 374, to a security engine (not shown).

In some embodiments, security agent 360 sends the gathered context information 374 to the security engine by encapsulating the outgoing request packet with headers that store the connection and context information. For example, in some embodiments, the security engine encapsulates the outgoing packet using a tunneling protocol (e.g., Generic Routing Encapsulation (GRE), Network Virtualization using Generic Routing Encapsulation (NVGRE), etc.) and includes the context information in the tunnel headers of the outgoing packet. The security engine receives the context and connection information and updates the rules (e.g., allow, block, etc.) and security policies accordingly. The operations of the security engine are described in further detail below with reference to FIG. 5.

In the fourth stage 304, the packet 380 is also tagged with a tag 385 (T1) in the buffer 355. In addition, the security agent 360 stores a map 390 of the tuple information of packet 380 and the associated tag value T1 in a security storage 365. The stored values in the security storage 365 are used to verify the integrity of the packet as it traverses the network stack towards the network (through the virtual network interface card (vNIC) 350). In some embodiments, the tag is a TCP endpoint handle, a 64-bit tag value for tagging packets in the buffer.

In some embodiments, the security agent 360 captures the network request packets at the different layers (e.g., transport layer 342) using wrapper or callback functions (e.g., OUTBOUND_TRANSPORT(SYN)). The security agent 360 of some embodiments includes functions within wrapper functions for the transport layer to tag a request packet in the buffer 355 and store the associated tuple information for the request packet in security storage 365. For example, in a Windows implementation, callbacks can be used to provide hooks to the winsock library calls or to capture calls to the "connect" and "accept" functions of the socket application programming interface (API). The security agent 360 of some embodiments make capture requests at various points in the duration of the connection (e.g., prior to the connection (ALE_CONNECT), post-connection completion (ALE_FLOW_ESTABLISHED), etc.).

By tagging the packet 380 in the buffer 355 with tag value 385, the tagged packet 380 can be accessed at other layers of the packet processing by the tag value 385. In particular, the packet 380 can be tagged at a first, higher layer (e.g., transport layer 342) and then verified again at a second, lower layer (e.g., network adapter layer 345), even if the packet is modified, before the packet is put on the wire (e.g., sent through the vNIC).

The fifth stage 305 shows that the packet 380 has now been captured at the network adapter layer 345. This is the last layer at which the network connection initiation packet can be modified before it is put on the wire (i.e., sent out on vNIC 350). In the fifth stage 305, the security agent 360 verifies the tuple of the network connection packet 380 against the mapped tag-tuple combination 390 in the security storage 365. In some embodiments, the security agent 360 verifies the tuple by determining whether the tag is missing or the tuple is mismatched. For example, a tag may be missing if packets are injected at layers below the layer where the security agent 360 tags the packets for the connection (e.g., the socket layer 335). The security agent 360 of some embodiments determines that the tuples are mismatched by identifying the tag value (e.g., T1) associated with the captured packet and determining whether the tuple information mapped to the identified tag value in the security storage 365 matches the tuple information for the tagged packet 380 in the buffer 355.

The tuple information for the request packet 380 may change for a variety of reasons (e.g., proxies, redirects, etc.). In this example, the stored verification tuple 390 does not match the tuple of the buffered packet 380 (i.e., the destination IP has been modified from IP2 to IP3). The sixth stage 306 shows that when the security agent 360 is unable to verify the network connection packet (e.g., the tuple information does not match the stored values), the security agent 360 sends updated context and tuple information 376 to the security engine. The security engine then uses the updated context and tuple information to implement security decisions (e.g., identity firewalls) for the network connection request. The sixth stage 306 also shows that the network request packet 380 is sent toward the vNIC 350 to be sent to the security engine for processing.

Figure 4:
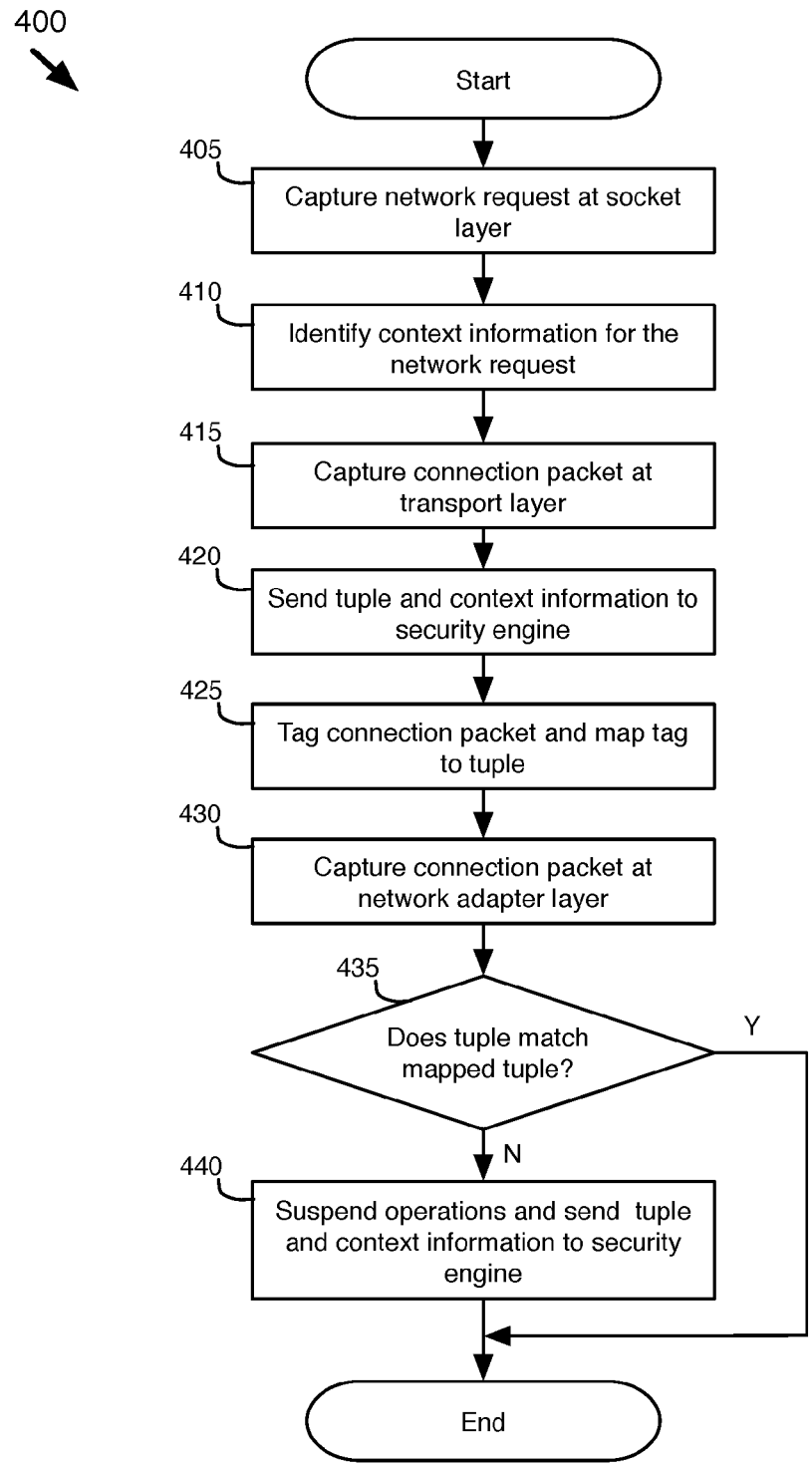
FIG. 4 conceptually illustrates a process for monitoring outbound connections.

FIG. 4 conceptually illustrates a process for monitoring outbound connections. The process 400 captures (at 405) a network request at the socket layer. The process 400 then identifies (at 410) context information (e.g., user and/or application information) associated with the network request.

The process 400 then captures (at 415) the connection packet (e.g., a TCP SYN packet) at the transport layer (or a first layer at which a network request packet becomes available). The process 400 then sends (at 420) the identified context information, as well as tuple information for the network request packet, to a security engine so that the security engine can identify security rules and policies to apply to the network request packets.

The process 400 tags (at 425) the connection packet and maps the tag to the tuple. The process 400 then recaptures (at 430) the connection packet at the network adapter layer, or the last layer before the packet is put on the wire. The process 400 then determines (at 435) whether the tuple matches the mapped tuple. When the process 400 determines (at 435) that the tuple does not match the mapped tuple, the process 400 suspends (at 440) the operations at the network layer and sends the tuple and context information to a security engine for performing various security functions. In some embodiments, when the tuple does not match, the tuple information sent (at 440) by the process 400 includes both the original tuple information, as well as the modified tuple information so that the security engine can identify the appropriate firewall rules. The process 400 then ends.

However, suspending operations at the network layer and delivering the information to the security services for all the connections create significant performance overhead. Therefore, it is desirable to avoid suspending and resending tuple and context information when it can be avoided, especially as the majority of the network requests will match when the packets are verified. When the process 400 determines (at 435) that the tuple matches the mapped tuple, the packet is processed normally and the process ends.

Figure 5:
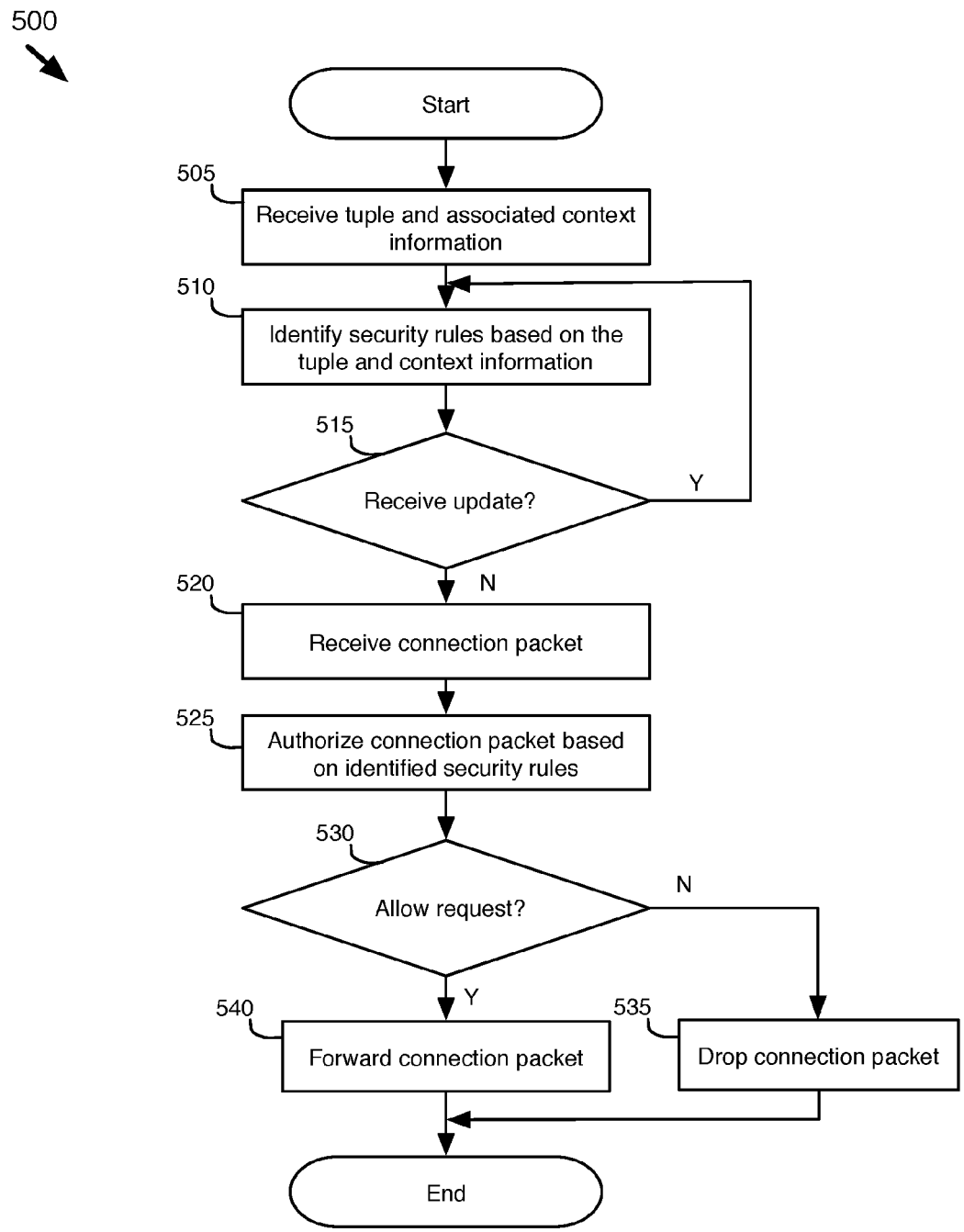
FIG. 5 conceptually illustrates a process for identifying security policies based on received tuple and contextual information.

As described above, the security engine receives context and connection information from the security agent in order to enforce the security policies for the network. FIG. 5 conceptually illustrates a process 500 for identifying security policies based on received tuple and contextual information. The process 500 of some embodiments is performed by a security engine or security VM as described above with reference to FIG. 2. The process 500 receives (at 505) tuple and context information from a security agent operating within a guest VM and identifies (at 510) a set of security rules based on the received information. In some embodiments, the process 500 identifies (at 510) the security rules or policies by receiving them from a security policy manager that manages the security policy for several security engines operating on several different hosts in the network. Alternatively, or conjunctively, each security engine maintains its own set of security rules and/or policies.

The process 500 then determines (at 515) whether an update for the particular connection request has been received. In some embodiments, the tuple and context information received (at 505) contains both the original tuple information and the modified information so that the security engine can identify the information as an update.

When the process 500 determines (at 515) that an update has been received, the process returns to step 510 and identifies another set of security rules based on the updated information. When the process 500 determines (at 515) that no updates are received, the process continues to 520 and receives the actual connection packet.

The process 500 authorizes the connection packet based on the identified security rules and determines (at 530) whether to allow the request. When the process 500 determines (at 530) to deny the request, the process 500 drops (at 535) the connection packet and the process ends. When the process 500 determines (at 530) to allow the request, the process forwards (at 540) the request packet to a virtual switch in the hypervisor for distribution to the determined destination. In some embodiments, the process 500 modifies the request packet prior to forwarding (at 540) the request packet to the destination.

III. Monitoring Inbound Connections

Rather than (or in addition to) monitoring outbound connections of a VM, the security agent of some embodiments monitors inbound connection requests to determine what action should be taken with respect to a communication received from the virtual switch and destined for one of the VMs of the host machine.

Figure 6A:
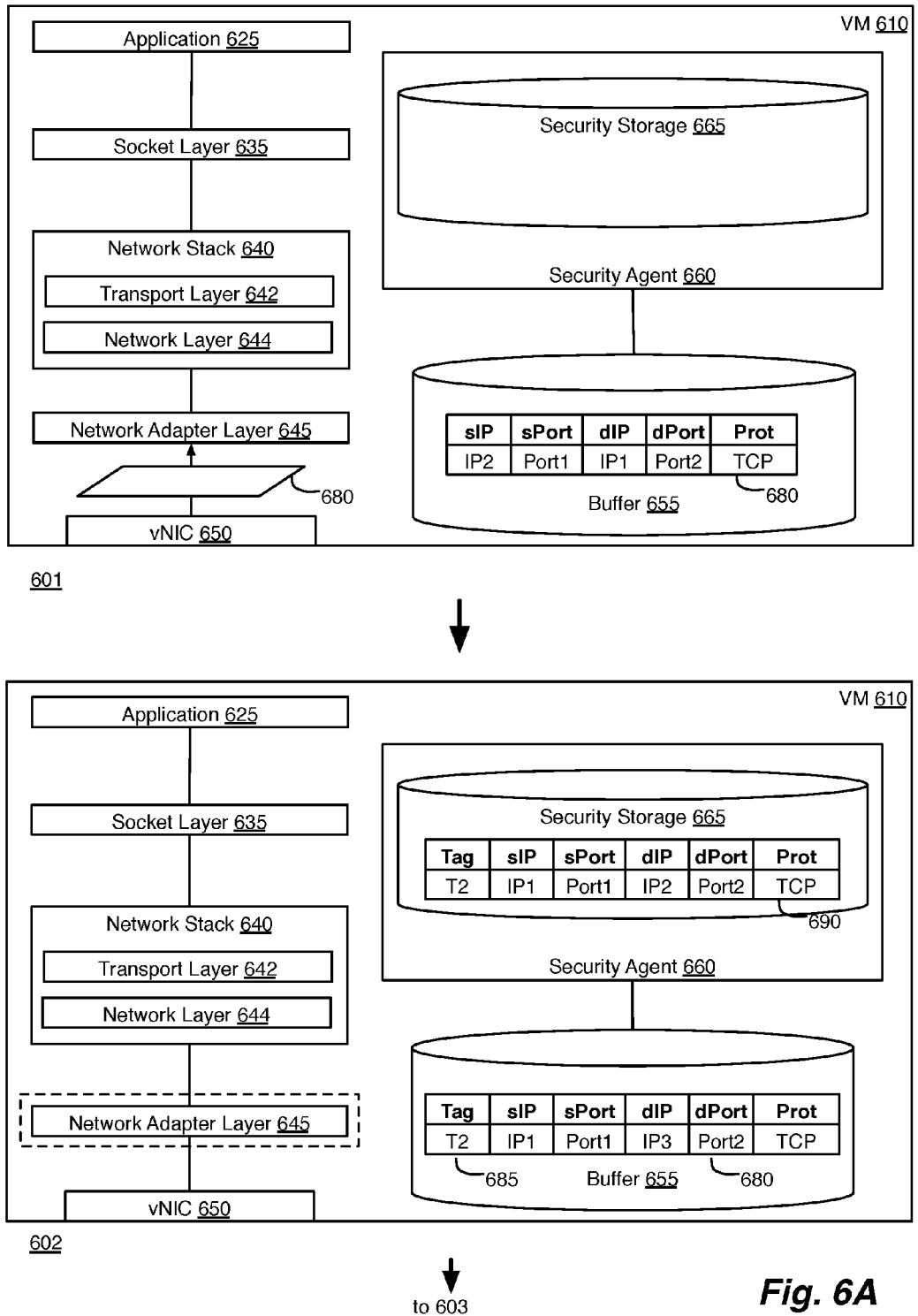
FIGS. 6A-C illustrate an example of monitoring inbound connections.
Figure 6B:
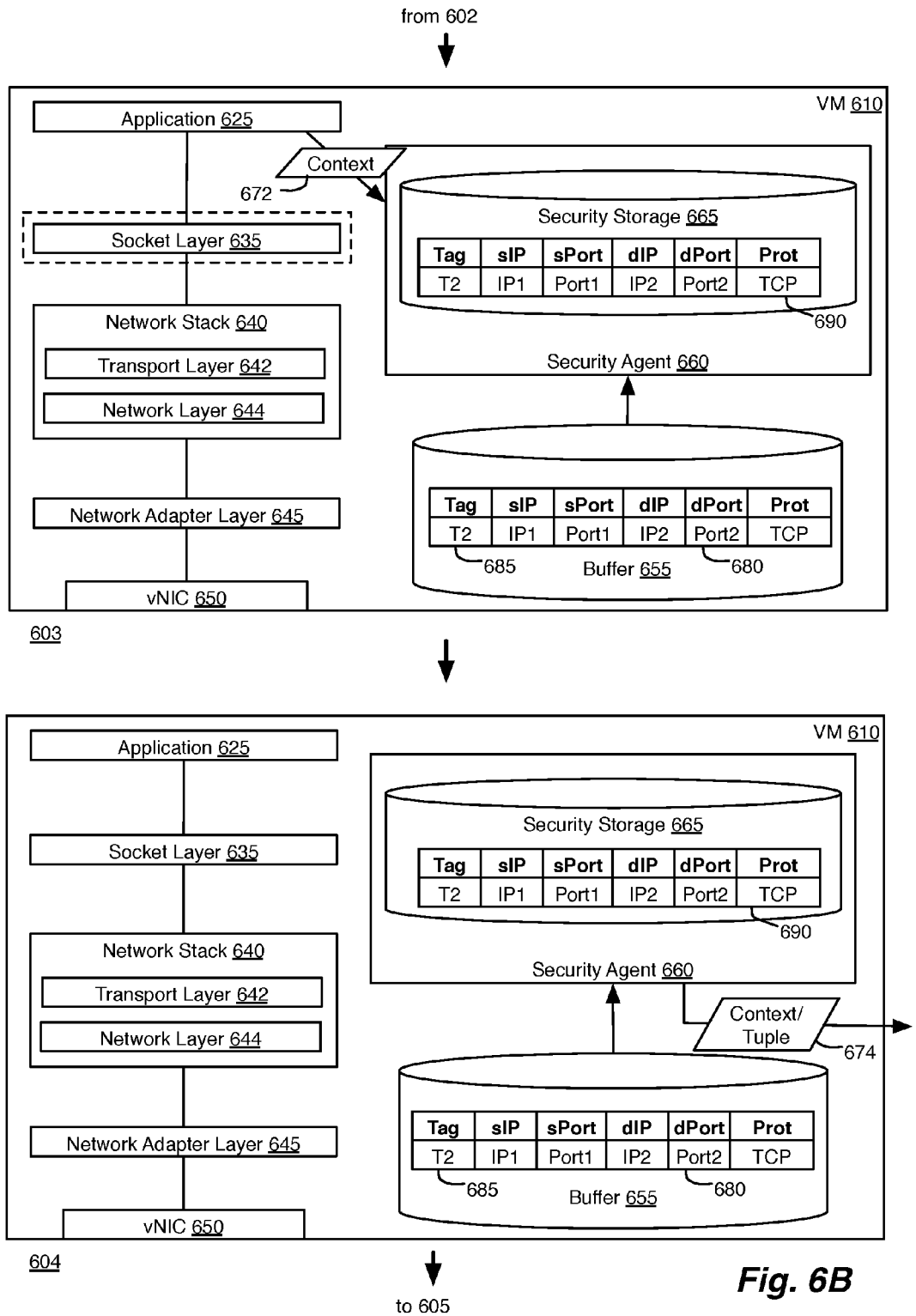
Figure 6C:
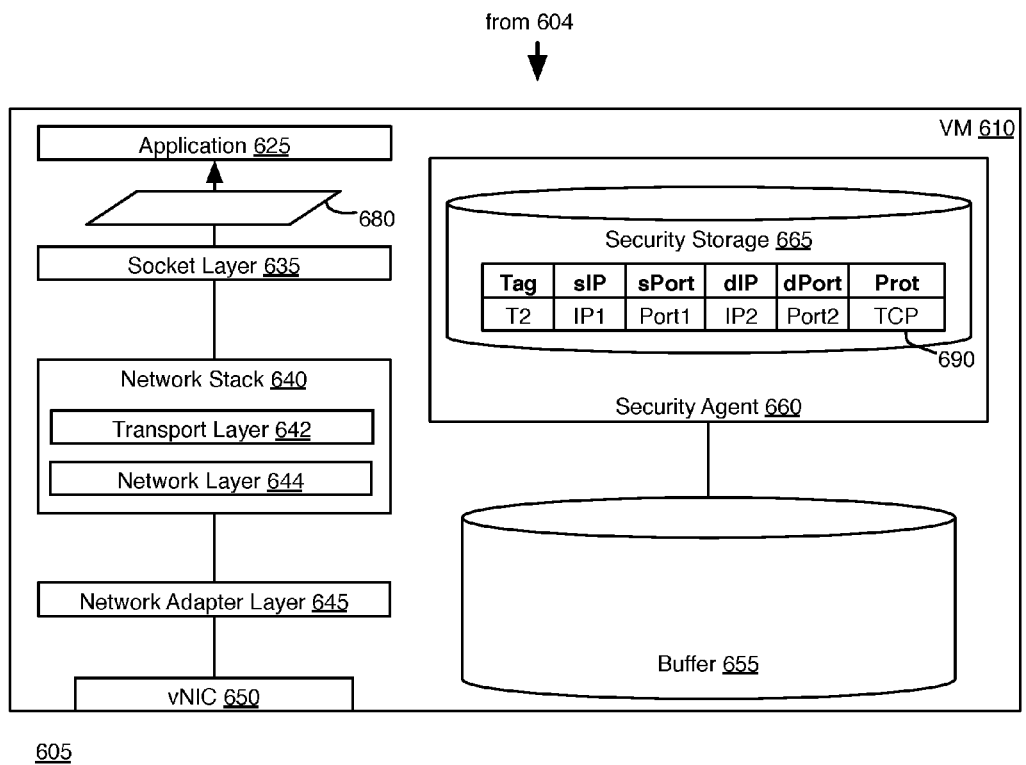

FIGS. 6A-C illustrate an example of monitoring inbound connections in five stages 601-605. Each stage of this example shows a VM 610 similar to the VM 210 and the corresponding elements shown in reference to FIG. 2. The first stage 601 illustrates that the VM 610 receives a network request packet 680 (also shown in buffer 655) through the vNIC 650, which specifies a request made from a client application of another client machine.

In the second stage 602, the request packet 680 from the client machine has been captured at the network adapter layer 645. The second stage 602 also shows that the packet 680 is tagged with a tag 685 (T2) in the buffer 355. In addition, the security agent 360 stores a map 690 of the tuple information of packet 680 and the associated tag value T2 in a security storage 665.

The third stage 603 shows that the network request packet 680 is recaptured at the socket layer 635. The third stage 603 also shows that the security agent 660 captures context information 672 from application 625. In some embodiments, the context information 672 includes user/process information for a server process (or application) that accepts the incoming connection.

In the fourth stage 604, security agent 660 collects connection information (e.g., tuple information) regarding the network connection request packet 680 and sends the connection information, along with the gathered context information 672, to a security engine (not shown). The security engine then makes a security decision for the connection request based on the received information.

In the fifth stage 605, the security agent 660 receives the response from the security engine allowing the network connection request, so the network request packet 680 is forwarded on to the application 625 to establish the requested connection. If the security engine had denied the network request, the security agent 660 of some embodiments would force the VM 610 to drop the request packet 680.

FIGS. 6A-C illustrate an example of monitoring inbound connections by performing security operations at the guest VM. In some embodiments, rather than (or in addition to) capturing the incoming request, the system performs the security operations on the outgoing confirmation message (e.g., SYN-ACK) that a server process sends back to the requesting client process. The process for performing the security operations based on the outgoing confirmation message is the same as the process 400 of FIG. 4 described above.

Figure 7:
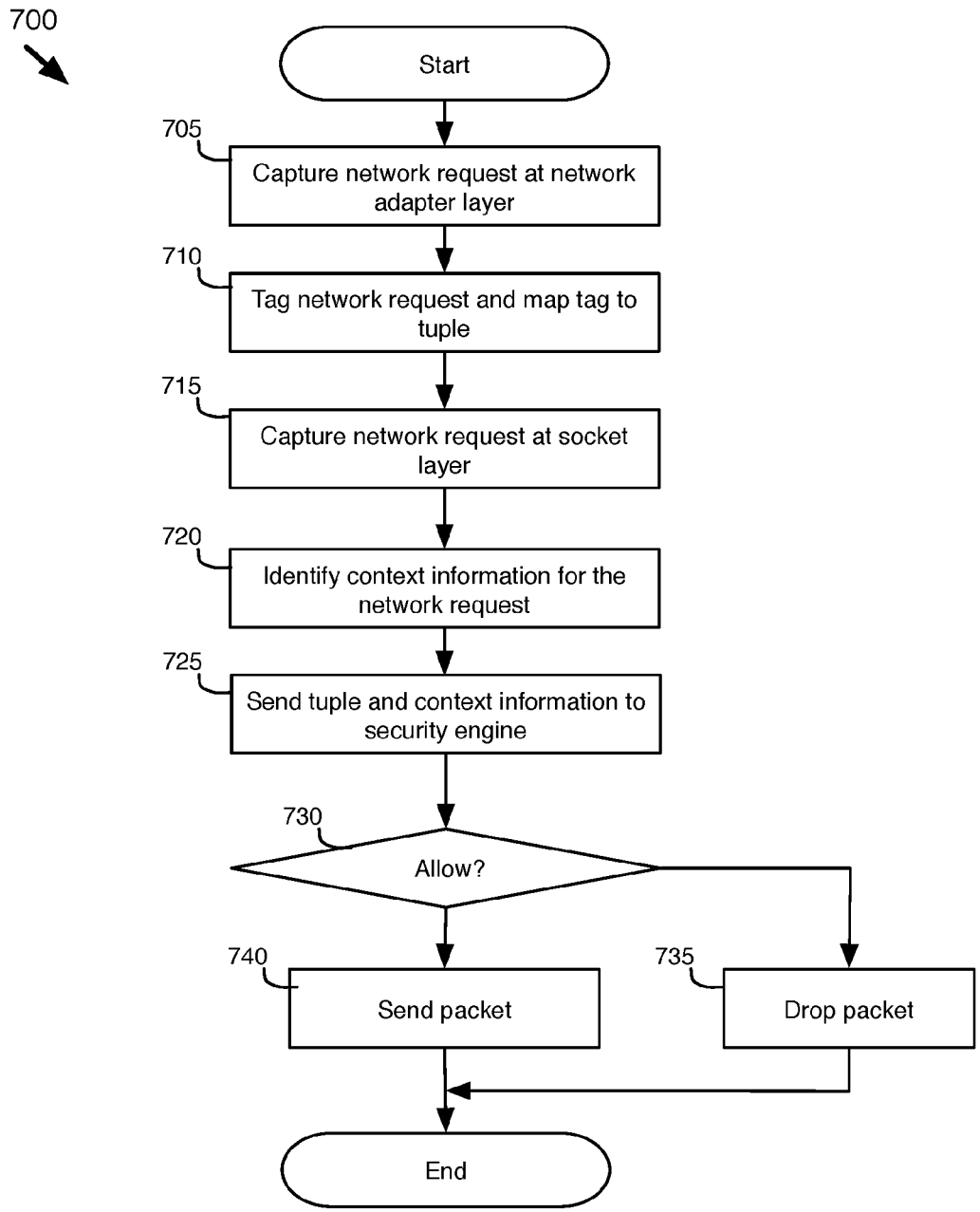
FIG. 7 conceptually illustrates a process of monitoring inbound connections to provide information to an external security engine in a packet tagging system FIG. 8 conceptually illustrates an electronic system with which some embodiments of the invention are implemented.

FIG. 7 conceptually illustrates a process of monitoring inbound connections to provide information to an external security engine in a packet tagging system. The process 700 begins by capturing (at 705) a network request packet at the network adapter layer. The network adapter layer is the first layer at which the packet is received upon entering the virtual machine. The process 700 then tags (at 710) the network request packet and maps the tag to the identified tuple in a security storage. The mapping associates the tag value with the connection information (e.g., tuple information) of the packet, which can be used to identify a particular connection.

The process 700 then captures (at 715) the network request again, at the socket layer. The socket layer of some embodiments is the first layer after the packet is processed through the network stack. The process 700 identifies (at 720) context information for the network request and sends (at 725) the tuple and context information at the security engine for verification and authentication.

The security engine of some embodiments uses the tuple and context information to identify the appropriate security policies to apply to the packet. In some embodiments, the process 700 then determines (at 730) whether to allow the network connection request packet based on a response received from the security engine. When the process 700 determines (at 730) that the connection is not to be allowed, the process 700 drops (at 735) the packet. When the process 700 determines (at 730) that the connection is allowed, the process 700 sends (at 740) the packet to server application to initiate the connection.

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
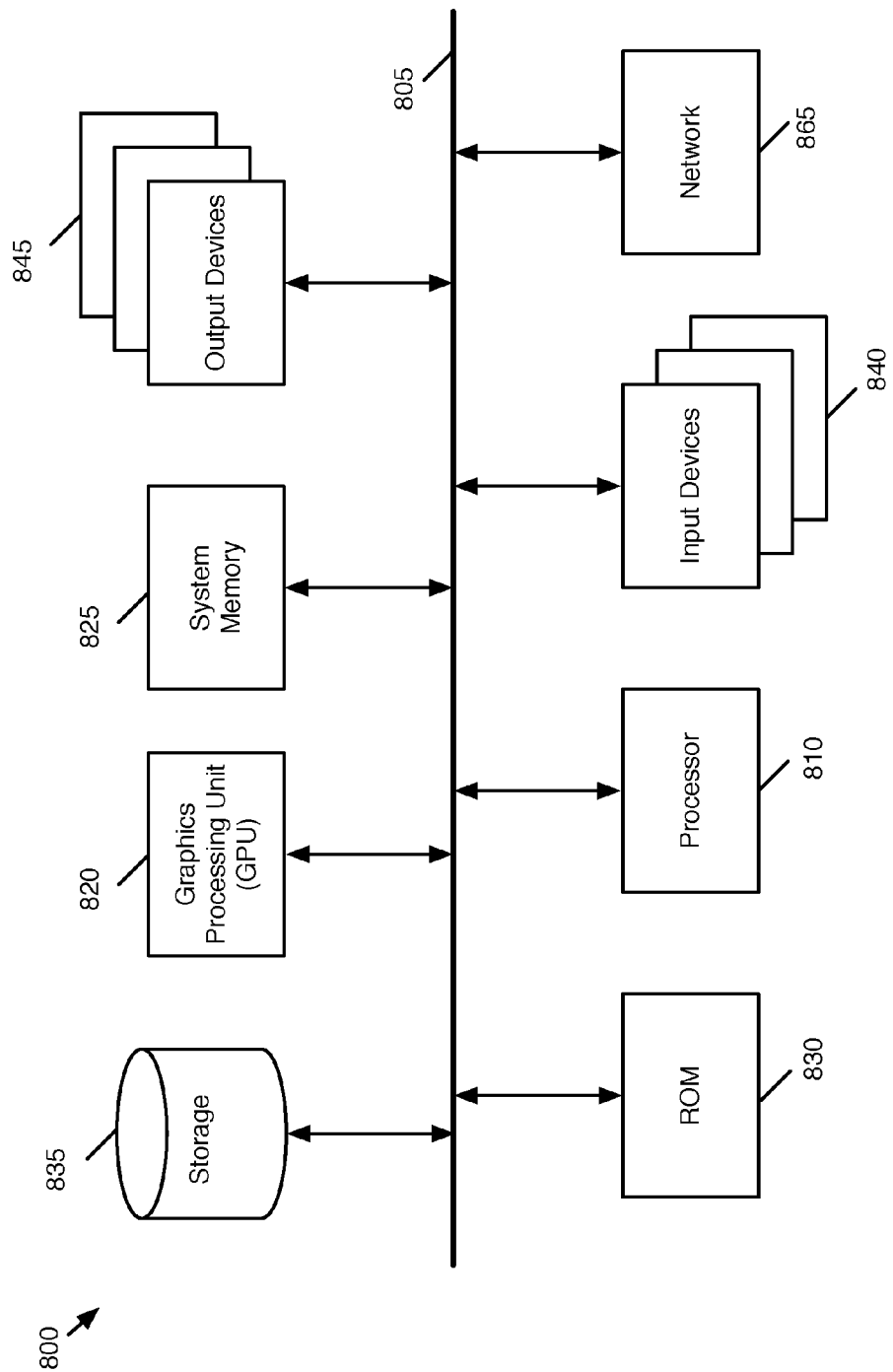

FIG. 8 conceptually illustrates an electronic system 800 with which some embodiments of the invention are implemented. The electronic system 800 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the read-only memory 830, the system memory 825, and the permanent storage device 835.

From these various memory units, the processing unit(s) 810 retrieves instructions to execute and data to process in order to execute the processes of the invention. The processing unit(s) may be a single processor or a multi-core processor in different embodiments.

The read-only-memory (ROM) 830 stores static data and instructions that are needed by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 835.

Other embodiments use a removable storage device (such as a floppy disk, flash memory device, etc., and its corresponding drive) as the permanent storage device. Like the permanent storage device 835, the system memory 825 is a read-and-write memory device. However, unlike storage device 835, the system memory 825 is a volatile read-and-write memory, such a random access memory. The system memory 825 stores some of the instructions and data that the processor needs at runtime. In some embodiments, the invention's processes are stored in the system memory 825, the permanent storage device 835, and/or the read-only memory 830. From these various memory units, the processing unit(s) 810 retrieves instructions to execute and data to process in order to execute the processes of some embodiments.

The bus 805 also connects to the input and output devices 840 and 845. The input devices 840 enable the user to communicate information and select commands to the electronic system. The input devices 840 include alphanumeric keyboards and pointing devices (also called "cursor control devices"), cameras (e.g., webcams), microphones or similar devices for receiving voice commands, etc. The output devices 845 display images generated by the electronic system or otherwise output data. The output devices 845 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 8, bus 805 also couples electronic system 800 to a network 865 through a network adapter (not shown). In this manner, the computer can be a part of a network of computers (such as a local area network ("LAN"), a wide area network ("WAN"), or an Intranet, or a network of networks, such as the Internet. Any or all components of electronic system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

The term "packet" is used throughout this application to refer to a collection of bits in a particular format sent across a network. It should be understood that the term "packet" may be used herein to refer to various formatted collections of bits that may be sent across a network. A few examples of such formatted collections of bits are Ethernet frames, TCP segments, UDP datagrams, IP packets, etc.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A method for monitoring network requests from a particular machine executing on a host with a plurality of other machines, the method comprising:
   when a packet related to a network request reaches a first layer of a network protocol stack associated with the particular machine:
      tagging the packet with a tag value;
      mapping the tag value to a first set of tuples of the packet; and
      sending a first set of data related to the packet to a security engine, the first set of data comprising the first set of tuples;
   when the packet reaches a second layer of the network protocol stack:
      determining that the packet has been modified since exiting the first layer of the network protocol stack to reflect a second set of tuples different from the first set of tuples; and
      sending a second set of data to the security engine, the second set of data comprising the second set of tuples of the modified packet.

2. The method of claim 1, wherein the first and second sets of data further comprise context data that relates to at least one of a user and an application that initiated the network request.

3. The method of claim 1, wherein determining that the packet has been modified comprises:
   identifying the tag value for the packet;
   identifying the first set of tuples mapped to the tag value; and
   comparing the first set of tuples mapped to the tag value to the second set of tuples for the packet as received at the second layer of the network protocol stack.

4. The method of claim 3, wherein the second set of tuples for the packet does not match the first set of tuples when a proxy filter diverts the packet from a first destination address to a second, different destination address for a proxy server.

5. The method of claim 3, wherein tagging the packet comprises associating the tag value with the packet in a buffer of the machine, wherein identifying the tag value for the packet comprises retrieving the tag value from the buffer.

6. The method of claim 1 further comprising:
   receiving a security decision response from the security engine; and
   enforcing the security decision response.

7. The method of claim 6, wherein enforcing the security decision comprises dropping the packet when the security decision response denies the network request.

8. The method of claim 6, wherein the security engine determines the security decision response by applying a set of firewall policies to a set of data received from the particular machine.

9. The method of claim 8, wherein the set of firewall policies are based on an identification of at least one of an application and a user that initiates the network request.

10. The method of claim 1, wherein the particular machine is a first virtual machine operating on the host and the security engine operates on a second virtual machine operating on the host.

11. The method of claim 1, wherein the first layer of the network protocol stack is a transport layer of a Transmission Control Protocol/Internet Protocol (TCP/IP) stack, wherein the second layer is a network adapter layer that interfaces between a network stack and a network adapter of the particular machine through which the packet is to be sent.

12. The method of claim 1, wherein the packet related to the network request is a synchronization packet for initiating a Transmission Control Protocol (TCP) connection with a server.

13. The method of claim 1, wherein the particular machine operates as a server and the packet related to the network request is a synchronization acknowledgement packet for responding to a request from a client for a Transmission Control Protocol (TCP) connection.

14. The method of claim 1, wherein the first and second sets of tuples each comprise a source IP address, a source port, a destination IP address, a destination port, and a protocol of the packet.

15. The method of claim 1, wherein the method is performed by a security agent that operates in a secured memory of the particular machine, wherein the secured memory is not readily modified by other processes operating on the particular machine.

16. A non-transitory machine readable medium storing a program which when executed by at least one processing unit monitors network requests from a particular machine, the program comprising sets of instructions for:
   when a packet related to a network request reaches a first layer of a network protocol stack associated with the particular machine:
      tagging the packet with a tag value;
      mapping the tag value to a set of tuples associated with the packet; and
      sending a first set of data related to the packet to a security engine;
   when the packet reaches a second layer of the network protocol stack:
      determining that the packet has been modified since exiting the first layer of the network protocol stack; and
      sending a second set of data different from the first set of data to the security engine, the second set of data related to the modified packet.

17. The non-transitory machine readable medium of claim 16, wherein the first and second sets of data further comprise context data that relates to at least one of a user and an application that initiated the network request.

18. The non-transitory machine readable medium of claim 16, wherein the set of instructions for determining that the packet has been modified comprises sets of instructions for:
identifying the tag value for the packet;
identifying the set of tuples mapped to the tag value; and
comparing the set of tuples mapped to the tag value to a current set of tuples for the packet as received at the second layer of the network protocol stack.

19. The non-transitory machine readable medium of claim 18, wherein the set of instructions for tagging the packet comprises a set of instructions for associating the tag value with the packet in a buffer of the machine, wherein the set of instructions for identifying the tag value for the packet comprises a set of instructions for retrieving the tag value from the buffer.

20. The non-transitory machine readable medium of claim 16, wherein the program comprises sets of instructions for:
receiving a security decision response from the security engine, wherein the security engine determines the security decision response by applying a set of firewall policies to a set of data received from the particular machine; and
enforcing the security decision response by dropping a packet when the security decision response denies the network request.

21. The non-transitory machine readable medium of claim 20, wherein the set of firewall policies are based on an identification of at least one of an application and a user that initiates the network request.

22. The non-transitory machine readable medium of claim 16, wherein the particular machine is a first virtual machine operating on a host machine and the security engine operates on a second virtual machine operating on the host machine, wherein the program is a security agent that operates in a secured memory of the particular machine, wherein the secured memory is not readily modified by other processes operating on the particular machine.

23. The non-transitory machine readable medium of claim 16, wherein the first layer of the network protocol stack is a transport layer of a Transmission Control Protocol/Internet Protocol (TCP/IP) stack, the second layer is a network adapter layer that interfaces between a network stack and a network adapter of the particular machine through which the packet is to be sent, and the packet related to the network request is a synchronization packet for initiating a TCP connection with a server.

24. The non-transitory machine readable medium of claim 16, wherein the first and second sets of tuples each comprise a source IP address, a source port, a destination IP address, a destination port, and a protocol of the packet.

* * * * *